United States Patent
Philpott et al.

(10) Patent No.: US 9,961,415 B2
(45) Date of Patent: May 1, 2018

(54) METHOD AND SYSTEM FOR IDENTIFYING EVENTS IN A STREAMING MEDIA PROGRAM

(71) Applicant: GOOGLE INC., Mountain View, CA (US)

(72) Inventors: Gregory Robert Philpott, Toronto (CA); Indravadan Vipinbhai Patel, Toronto (CA); Christopher Gary Dinn, Toronto (CA)

(73) Assignee: Google LLC, Mountain View, CA (US)

(*) Notice: Subject to any disclaimer, the term of this patent is extended or adjusted under 35 U.S.C. 154(b) by 391 days.

(21) Appl. No.: 14/163,310

(22) Filed: Jan. 24, 2014

(65) Prior Publication Data
US 2014/0207964 A1 Jul. 24, 2014

Related U.S. Application Data

(60) Provisional application No. 61/756,190, filed on Jan. 24, 2013.

(51) Int. Cl.
| | |
|---|---|
| *H04N 21/8543* | (2011.01) |
| *H04N 21/81* | (2011.01) |
| *H04N 21/44* | (2011.01) |
| *H04N 21/845* | (2011.01) |
| *H04L 29/06* | (2006.01) |

(52) U.S. Cl.
CPC ..... *H04N 21/8543* (2013.01); *H04L 65/4084* (2013.01); *H04L 65/602* (2013.01); *H04N 21/44016* (2013.01); *H04N 21/812* (2013.01); *H04N 21/8453* (2013.01)

(58) Field of Classification Search
CPC ...... H04L 50/60; H04L 65/4084; H04L 29/06
USPC .............................. 709/231; 700/95
See application file for complete search history.

(56) References Cited

U.S. PATENT DOCUMENTS

| | | | |
|---|---|---|---|
| 6,792,047 B1 | 9/2004 | Bixby et al. | |
| 7,548,565 B2 | 6/2009 | Sull et al. | |
| 8,145,782 B2 | 3/2012 | McGowan et al. | |
| 2001/0044834 A1* | 11/2001 | Bradshaw | G06F 17/3089 709/217 |
| 2002/0042920 A1* | 4/2002 | Thomas | G06F 3/0481 725/87 |
| 2004/0158858 A1 | 8/2004 | Paxton et al. | |
| 2004/0237102 A1 | 11/2004 | Konig et al. | |

(Continued)

FOREIGN PATENT DOCUMENTS

| | | |
|---|---|---|
| CA | 2574998 A1 | 2/2006 |
| WO | 2011150293 A1 | 12/2011 |
| WO | 2012074762 A1 | 6/2012 |

*Primary Examiner* — Kevin Bates
*Assistant Examiner* — Chen-Liang Huang
(74) *Attorney, Agent, or Firm* — Foley & Lardner LLP

(57) ABSTRACT

The present invention teaches a method and system for uniquely defining and identifying events within a streaming media program. Programs and additional content can be stored with inband data in the stored content and that inband data can be dynamically updated, to include additional information such as instance counters, when the stored content it is requested by a rendering device. The additional information is used to uniquely identify the rendering of the program or additional content to allow a rendering device to perform actions based upon those unique identifiers.

20 Claims, 2 Drawing Sheets

(56) References Cited

U.S. PATENT DOCUMENTS

| | | | |
|---|---|---|---|
| 2005/0195205 A1* | 9/2005 | Abrams, Jr. | G09G 3/3611 345/545 |
| 2007/0089126 A1 | 4/2007 | Fritz et al. | |
| 2007/0188303 A1* | 8/2007 | Faro | G07C 9/00103 340/5.73 |
| 2007/0220566 A1 | 9/2007 | Ahmad-Taylor | |
| 2008/0046917 A1* | 2/2008 | de Heer | G06Q 30/02 725/32 |
| 2008/0092168 A1 | 4/2008 | Logan et al. | |
| 2008/0274752 A1 | 11/2008 | Houri | |
| 2009/0049090 A1 | 2/2009 | Shenfield et al. | |
| 2009/0077580 A1 | 3/2009 | Konig et al. | |
| 2009/0204664 A1* | 8/2009 | Yovin | G06Q 30/02 709/203 |
| 2010/0037204 A1 | 2/2010 | Lin et al. | |
| 2010/0124907 A1 | 5/2010 | Hull et al. | |
| 2010/0153544 A1* | 6/2010 | Krassner | G06F 17/2247 709/224 |
| 2010/0192219 A1* | 7/2010 | Carvajal | H04N 21/44222 726/19 |
| 2010/0228880 A1 | 9/2010 | Hunt et al. | |
| 2011/0145858 A1 | 6/2011 | Philpott et al. | |
| 2011/0265116 A1 | 10/2011 | Stern et al. | |
| 2011/0302307 A1 | 12/2011 | Zhong et al. | |
| 2011/0307623 A1 | 12/2011 | George et al. | |
| 2011/0307781 A1 | 12/2011 | Sood et al. | |
| 2012/0005313 A1 | 1/2012 | McGowan et al. | |
| 2012/0030182 A1* | 2/2012 | Claman | G11B 27/034 707/690 |
| 2012/0030313 A1 | 2/2012 | McGowan et al. | |
| 2012/0042050 A1 | 2/2012 | Chen et al. | |
| 2012/0042089 A1 | 2/2012 | Chen et al. | |
| 2012/0042090 A1 | 2/2012 | Chen et al. | |
| 2012/0047542 A1 | 2/2012 | Lewis et al. | |
| 2012/0059721 A1 | 3/2012 | Blegen | |
| 2012/0066285 A1 | 3/2012 | McGowan et al. | |
| 2012/0066386 A1 | 3/2012 | McGowan et al. | |
| 2012/0072465 A1 | 3/2012 | McGowan et al. | |
| 2012/0072541 A1 | 3/2012 | Carls et al. | |
| 2012/0072542 A1 | 3/2012 | McGowan | |
| 2012/0124624 A1 | 5/2012 | Lau et al. | |
| 2012/0185895 A1 | 7/2012 | Wong et al. | |
| 2012/0197419 A1* | 8/2012 | Dhruv | H04N 21/6543 700/94 |
| 2012/0198089 A1 | 8/2012 | Dhruv et al. | |
| 2012/0198492 A1 | 8/2012 | Dhruv et al. | |
| 2012/0254367 A1 | 10/2012 | McGowan | |
| 2012/0259946 A1 | 10/2012 | Stockhammer et al. | |
| 2012/0297417 A1* | 11/2012 | Philpott | H04N 21/458 725/34 |
| 2013/0060911 A1 | 3/2013 | Nagaraj et al. | |
| 2013/0091251 A1 | 4/2013 | Walker et al. | |
| 2013/0276008 A1* | 10/2013 | Wu | H04N 21/42209 725/14 |
| 2013/0291001 A1* | 10/2013 | Besehanic | H04N 21/44204 725/20 |
| 2013/0291002 A1* | 10/2013 | Rothschild | H04N 21/258 725/25 |

* cited by examiner

METHOD AND SYSTEM FOR IDENTIFYING EVENTS IN A STREAMING MEDIA PROGRAM

RELATED APPLICATIONS

This application claims priority from U.S. patent application 61/756,190, filed Jan. 24, 2013. Priority is claimed to this earlier filed application and the contents of this earlier filed application is incorporated herein, in its entirety, by reference.

FIELD OF THE INVENTION

The present invention relates to a system and method for identifying events in a streaming media program. More particularly, the present invention relates to a system and method for defining and uniquely identifying events, which occur in a streaming media program.

BACKGROUND OF THE INVENTION

The spread of the Internet and the general availability of data connections is changing the way media is provided and used. In particular, conventional television and/or radio (i.e.—audio) services are increasingly giving way to digital network-based streaming media on demand and/or live streaming media. Such streaming media content can be delivered through any digital network, such as a cable company's set top box-based network or a cellular data network, or increasingly, through the Internet, either via wired connection or wireless. The delivery can be to any suitable rendering device, such as an Apple TV or an Xbox 360, which are appropriately connected to a television or monitor, or can be to a combined rendering device and display, such as an Internet TV or to a mobile device, such as player software executing on an Apple iPad, a laptop computer, a mobile phone, etc.

As the market shifts towards delivery of content via such streaming media delivery systems, means to monitor the playback of media need to be developed to improve the user experience and to improve revenue generation models. In particular, the ability to appropriately manage and monitor advertising in such streaming media offers new opportunities to advertisers and content deliverers and a more enjoyable experience for users.

For example, it is desirable, when media is requested by a viewer, to select the advertisements to be shown and/or played during the delivery of the program (i.e.—targeted advertisements), the advertisements being selected based upon any suitable criteria, such as: viewer demographics, including where the player/viewer is located and/or the particular viewer watching the content; the type of rendering device (mobile versus fixed) that the content is being played on; etc. In fact, a wide range of demographic and other criteria could be applied to the selection of which advertisements (or other content) will be shown to which viewers and the full range of such considerations is beyond the scope of the present invention.

However, players and/or devices for rendering streaming media can operate on a model of the user requesting a desired program from a content delivery network and then downloading a manifest (or equivalent) defining the requested program and/or additional content, such as advertisements. In most streaming media systems, the program is arranged in chunks defining fixed portions of the program for rendering (e.g.—ten seconds of video and audio) and the player downloads the chunks of the program as needed.

The manifest defines which chunks represent which portions of the program and includes the information necessary for the player to download, from a content delivery network or other source, the chunks of the requested program necessary for rendering the program and additional content.

In most practical cases, the player will allow the user to fast forward and/or rewind through the downloaded program as desired and thus it is not possible to determine when, or if, a specific viewing event within the program occurs. For example, an advertisement included in the downloaded program may be included twice within the downloaded manifest and, to date, it has not been possible to determine which of the two occurrences has been viewed by a user who may be fast forwarding or rewinding throughout the program (typically referred to as "scrubbing" through the program).

It should also be noted that there is no guaranteed correlation between the chunks of the program downloaded by a player and what is actually rendered by the player, and viewed by the user, as chunks are downloaded and cached by the player and may not ever, in fact, be viewed by a user scrubbing through a program.

For a variety of reasons, it is desired to know when a specific viewing event has occurred and, in many cases, to invoke a corresponding rendering device action when that specific viewing event has occurred. For example, an advertiser may be charged different rates depending upon whether their advertisement is played during the most popular part of a program, or a less popular part and, if the player can determine which specific viewing event has occurred, it can report that event back to the content delivery network, or other interested party. In addition to reporting back, a variety of other rendering device actions can be performed when specific viewing points are reached in a program. A common rendering device action that is often desired by advertisers is to lock the player's controls during playback of an advertisement to prevent fast forwarding through the advertisement. Other rendering device actions can include displaying overlay materials or other content on the player, updating various timers or clocks in the player, etc.

Accordingly, it is desired to have a system and method for defining and uniquely identifying events which occur during the playback of a streaming media program.

SUMMARY OF THE INVENTION

It is an object of the present invention to provide a novel system and method for defining and uniquely identifying events, which occur during the playback of a streaming media program.

According to a first aspect of the present invention, there is provided a method of identifying events in a streaming media program delivered to a rendering device, comprising the steps of: a streaming media system receiving from a rendering device a request for a streaming media program; delivering a manifest to the rendering device from the streaming media system, the manifest identifying the content the rendering device is to obtain to render the requested streaming media program and additional content; the rendering device requesting relevant portions of the identified content from the streaming media system to render portions of the requested media program and additional content; the requested relevant portions of the identified content including inband data defining at least one time related event unique to the instance of the additional content provided;

and the rendering device identifying the occurrence of an event defined by the inband data and performed an action corresponding to the identified event.

According to a second aspect of the present invention, there is provided a streaming media system, comprising: a program management system responsive, to a request for a streaming media program from a rendering device, to provide a manifest identifying stored content the rendering device is to obtain to render the requested streaming media program and additional content; a content delivery network responsive to download requests from the rendering device for the content identified in the manifest to deliver the requested content to the rendering device; and an inband data manager operable to include inband data defining at least one time related event unique to the instance of the additional content provided to the rendering device.

Thus, the present invention provides a method and system for uniquely defining and identifying events within a streaming media program. Programs and additional content can be stored with inband data in the stored content and that inband data can be dynamically updated, to include additional information such as instance counters, when it is requested by a rendering device. The additional information is used to uniquely identify the rendering of the program or additional content to allow a rendering device to perform actions based upon those unique identifiers.

Other features and advantages of the present invention are described more fully below.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

As used herein, the term "streaming media" and "streaming media program" are intended to broadly encompass any media program including at least one of digital video and/or digital audio content which can be rendered and played by a rendering device at the receiving end of one or more wired, or wireless, data connections. Streaming media or streaming media programs can be audio programs and/or music, video on demand programs, linear video programs, live video programs or interactive programs and can be transported through the data network in any suitable manner as will occur to those of skill in the art.

Further, while the following discussion refers, as an example, to streaming media delivered in Moving Picture Experts Group transport streams via the hyper text transport protocol (HTTP) Live Streaming (HLS) protocol and/or to streaming media delivered via the Dynamic Adaptive Streaming over HTTP (DASH) protocol, the present invention is not so limited. Instead the present invention can be employed with a wide variety of streaming protocols and network protocols for delivering streaming media programs provided only that the protocols allow for the inclusion of inband data, which can be related to program time events.

Figure 1:
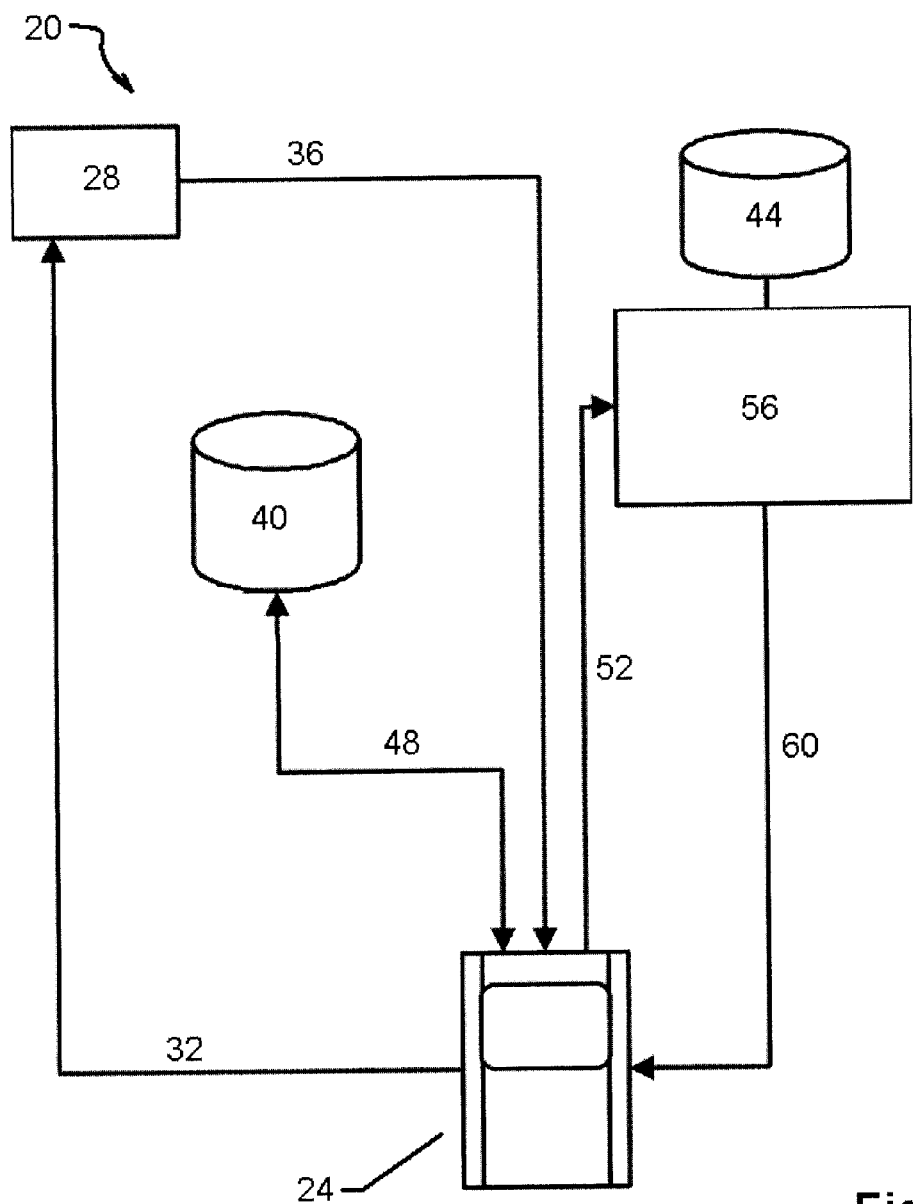
FIG. 1 shows a block diagram of a streaming media system in accordance with an embodiment of the present invention.

FIG. 1 shows a streaming media system 20 in accordance with the present invention and a rendering device 24 for playback of streaming media. As will be apparent, rendering device 24 can be a dedicated playback device, such as a purpose built digital media player, or can be an appropriate software player executing on hardware configurable to render media (for example, images and/or audio and/or video) such as a computing tablet (eg.—as an Apple iPad) or the like, a gaming device (eg.—a Microsoft Xbox360) or the like, a media player, such as an Apple TV, connected to an appropriate television or other display, etc.

While not explicitly indicated in FIG. 1, the interconnection of components of system 20 and the connections to rendering device 24 are accomplished via one or more data networks. As will be apparent from the description below, these data networks can be proprietary/private, such as cable companies' set-top box networks, and/or public networks, such as the Internet. It is contemplated that, in many circumstances, a combination of proprietary and public networks will be employed in system 20. Moreover, these data networks can typically comprise different combinations of wide area, local area and personal networks. Further, these data networks can be wired, or wireless, permitting delivery of streaming content to rendering devices 24 at fixed locations and/or to rendering devices 24 which are mobile and/or nomadic.

System 20 includes a program management system 28 which contains metadata and other information about streaming media programs available from system 20. Program management system 28, which can comprise a content information system, content management system or any other suitable system for accepting requests for streaming media programs, either includes, or has access to, pre-created manifests for the available content, or is capable of creating such manifests, or having them created, as needed.

When a user of rendering device 24 wishes to play a streaming media program available from system 20, rendering device 24 sends a request 32 for the desired program to program management system 28. The format of request 32 is not particularly limited and any method of requesting an available program can be employed.

It is contemplated that, in some embodiments, request 32 can include additional explicit and/or implicit information, indicating specifics about rendering device 24 (type of device, location of the device, etc.) and/or about the user of rendering device 24 (location of user from an IP address or GPS data provided by the rendering device, network the user is connecting through, user demographic information, etc. from the user's account set up information or the like) when such information is available. In other embodiments, this additional information can be provided, via a HTTP cookie, from the user's IP address or via any other suitable method as will be apparent to those of skill in the art. Such additional information can be used by system 20 in a variety of manners such as to assist in selecting a predefined manifest for the user requesting a program or for selecting advertisements and/or other additional content to be included in a manifest dynamically created for the user requesting the program.

Upon receiving a valid request 32, program management system 28 provides rendering device 24 with a manifest, in this example manifest 36, or a reference to manifest 36, for the requested streaming program. As mentioned above, manifest 36 can have been previously created for the requested program or can be created dynamically in response to receiving request 32 or can be mapped, for example, to a dynamically created manifest for a live streaming program.

In the illustrated embodiment of the present invention, manifest 36 includes URI's, or equivalent indicators or a suitable method of indicating remote data, which indicate the chunks of the requested streaming media program including any additional content.

In the present invention, Moving Picture Experts Group (MPEG) transport streams (hereinafter "TS streams") are employed to transport programs through the relevant network or networks to rendering device 24 and, in a present embodiment of the invention, these TS streams are stored on a content delivery network 40. While TS streams can include multiple programs, in the following discussion, for clarity, only TS streams containing a single program are discussed. It is to be understood, however, that the discussed methodology is also applicable to TS streams containing multiple programs.

Figure 2:
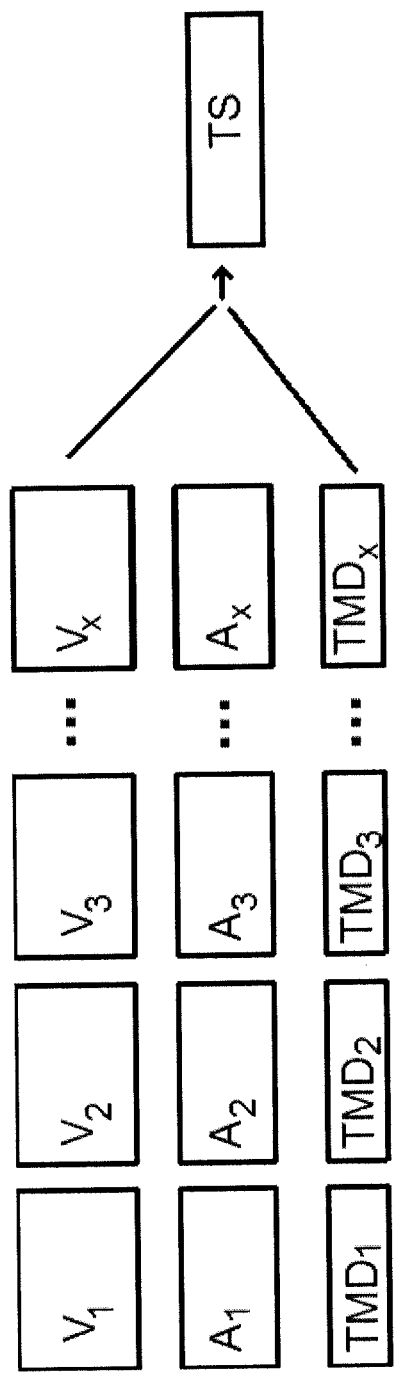
FIG. 2 shows a block diagram of a known MPG transport stream.

As shown in FIG. 2, a program in a TS stream is represented as a multiplexed (hereinafter "muxed") set of packetized elementary streams of: video data ($V_1$ thorough $V_x$); data for one or more audio tracks ($A_1$ through $A_x$), and inband data for timed metadata ($TMD_1$ through $TMD_x$). As mentioned above, the present invention is not limited to use with TS streams and/or timed metadata and, instead, can be used with any transport structure and/or protocol which provides or allows for inband data to be included to define program time related events. For example, timed events can be used in conjunction with the DASH protocol using, for example, event messages Other possible protocols will now occur to a person of skill.

In TS streams, timed metadata is written in the ID3 specification (as described, for example, in Timed Metadata for HTTP Live Streaming, https://developer.apple.com/library/ios/documentation/AudioVideo/Conceptual/HTTP_Live_Streaming_Metadata_Spec/2/2.html) and the present invention uses the ID3 "TXXX", user text tag to include the relevant metadata although it is contemplated that relevant metadata can be written, if preferred, in a wide range of formats and the present invention is not limited to use of ID3 or the TXXX tag format.

When a rendering device 24 renders a TS stream containing a timed metadata ID3 tag in a separate data track, that tag information is output by the rendering device 24 as it renders the time-associated video and/or audio content as further discussed below.

An example of a simplified portion of a manifest 36 in accordance with one embodiment of the present invention could be:

prg1.ts
prg2.ts
prg3.ts
ad_1/0/1.ts
ad_1/0/2.ts
ad_1/0/3.ts
prg4.ts
. . .
prg10.ts
ad_1/1/1.ts
ad_1/1/2.ts
ad_1/1/3.ts
prg11.ts
. . . .

In this example, references prg1.ts through prg11.ts represent eleven chunks of the main program requested by rendering device 24 and references ad_1/0/1.ts through ad_1/0/3.ts represent three chunks of additional content, in this case advertisement "ad1", and references ad_1/1/1.ts through ad_1/1/3.ts represent three chunks of a second reference to advertisement "ad1". While not shown in this example, for clarity, each reference in the manifest 36 is also associated with a program time which is the linear time within the timespan of the program that the content referred to represents.

For example, if the references in the manifest 36 above refer to chunks with ten second durations of content, then prg3.ts represents the content to be rendered in the program from the twenty-first second of the program until the thirtieth second of the program, while ad_1/0/1.ts represents the content to be rendered in the program from the thirty-first second of the program until the fortieth second of the program and prg4.ts represents the content to be rendered in the program from the seventy-first second of the program until the eightieth second of the program, etc.

When the chunks of the main program and additional content, such as advertisement "ad1" are created, any desired inband data, in this example timed metadata, is included in the respective chunks. In a current embodiment of the present invention, when each advertisement is arranged into a TS stream, timed metadata is included at least at: the start of the advertisement; the first quartile time point; the midpoint; the third quartile time point; and the end point of the advertisement. As will be apparent to those of skill in the art, a wide variety of alternative or additional tags can be employed, as desired, to determine the occurrence of a wide range of events—limited only by the imagination of the implementer—and, as described below, these events can be used for a similarly wide range of rendering device actions at rendering device 24.

In an embodiment of the present invention, the content of these metadata tags is preferably in the form of "content identifier_timepoint". For the specific example of an advertisement identified as "ad1" and with the five specific metadata tags mentioned above, the timed metadata tags would be: "ad1_START"; "ad1_1Q"; "ad1_MID"; "ad1_3Q"; and "ad1_END". In our example, advertisement "ad1" has a thirty second duration and is stored in a TS stream of three chunks, each chunk having a ten second duration. Thus, the first chunk includes the "ad1_START" metadata tag defined at the start time of "ad1" and the "ad1_1Q" metadata tag defined at the seven and a half second point of "ad1", the second chunk includes the "ad1_MID" metadata tag defined at the fifteen second point of "ad1" and the third chunk includes the "ad1_3Q" metadata tag defined at the twenty-two point five second point of "ad1" and the "ad1_END" metadata tag defined at the thirty second point of "ad1".

As will be apparent, the present invention is not limited to the use of these tag definitions, nor is it limited to the use of text-based tags and it is contemplated that a wide range of other text strings or numeric strings can be employed instead, as desired. For example, a unique numeric or text string identifier could be used to define each time point within a program and a database (not shown) can be maintained in system 20 to associate each unique numeric or text identifier with a specific piece of media and time event within that media. It is expected that a wide variety of other identification methods and schemes will occur to those of skill in the art.

In an embodiment of the present invention, the TS streams, with their included timed metadata tags, are stored at an additional content server 44. In variations, other suitable formats or representations may be used to store the content and the additional content. Thus, manifest 36 includes references (i.e.—prg1.ts, prg2.ts, etc) to the main program (or programs) which identify chunks of content on content delivery network 40 and references (i.e.—ad1/0/1.ts, etc.) which identify chunks of content on additional content server 44. Within system 20, the reference "ad1/0/1.ts" is understood as referring to the first chunk (i.e. ad1_1.ts) of the TS stream for advertisement "ad1" stored on additional content server 44. The "/0/" included in the reference (instance counter)? "ad1/0/1.ts" is understood as indicating that this is the first inclusion/instance of "ad1" in the manifest 36.

As rendering device 24 renders the program defined by manifest 36, it downloads corresponding content 48 from content delivery network 40 in the conventional manner. However, when rendering device 24 downloads additional content, as defined in manifest 36, that download request 52 is directed to an inband data manger 56, which receives the request and obtains the requested additional content (i.e.—ad1_1.ts) from additional content server 44. Inband data manager 56 then processes the content received from additional content server 44 to append the corresponding instance data to the timed metadata tags, if any, in that additional content.

In this example, if inband data manager 56 receives a request for "ad1/0/1.ts" from rendering device 24, inband data manager 56 retrieves the first chunk of "ad1" (i.e.—ad1_1.ts) from additional content server 44 and processes that chunk to locate any timed metadata tags in that chunk.

While FIG. 1 shows inband data manager 56 and additional content server 44 as being separate from content delivery network 40, the present invention is not so limited and either or both of inband data manager 56 and additional content server 44 can be part of content delivery network 40 if desired.

For each located timed metadata tag in ad1_1.ts (in this example "ad1_START" and "ad1_1Q"), inband data manager 56 appends the instance data (corresponding to that specified in the chunk identifier received from rendering device 24) to the metadata tags. In this example of a request from rendering device 24 for "ad1/0/1.ts", the instance data is "0" and inband data manager 56 will append a "0" to the metadata tags in the first chunk of ad1 so that those tags will be "ad1_START_0" and "ad1_1Q_0". Once inband data manager 56 has processed the requested additional content that processed additional content 60 is provided to rendering device 24.

Similarly, requests for "ad1/0/2.ts" and for "ad1/0/3.ts" will result in the second and third chunks of the TS stream for "ad1" being provided to rendering device 24 with their respective timed metadata tags having been processed to be: "ad1_MID_0"; "ad1_3Q_0"; "ad1_END_0".

When and/or if rendering device 24 requests "ad1/1/1.ts"; "ad1/1/2.ts" and "ad1/1/3.ts" from system 20, those requests are directed to inband data manager 56, as before, which retrieves the requested content ("ad1_1.ts", "ad1_2.ts" and "ad1_3.ts") from additional content server 44. Inband data manager 56 then processes the retrieved content to locate timed metadata tags and to append the corresponding instance data, in this case "1", to each located metadata tag. Thus, the chunk 60 provided to rendering device 24 in response to the request for "ad1/1/1.ts" will include timed metadata tags "ad1_START_1" and "ad1_1Q_1". The chunk 60 provided to rendering device 24 in response to the request for "ad1/1/2.ts" will include timed metadata tag "ad1_MID_1" and the chunk 60 provided to rendering device 24 in response to the request for "ad1/1/3.ts" will include timed metadata tags "ad1_3Q_1"; "ad1_END_1".

In variations, instance data can be supplemented or be substituted by other data such as unique identifiers. For example, in some variations, global unique identifiers (GUID) and time stamps can be used. Other identifiers will now occur to a person of skill.

In another embodiment, it is contemplated that additional content, or even the requested program, can have inband data relating to program time events defined and placed dynamically, by inband data manager 56 or content delivery network 40, or any other suitable location. In such a case, inband data manager 56, for example, will be provided with a "watch list" to identify stored content which is to have inband data relating to program time events inserted into the content and what and when that inband content is to be. For example, a watchlist can be in the form of metadata that identify one or more location to embed the events supplied through the inband manager. The location can be, for example, time or segment identifiers or URLs.

As an example, advertisement "ad1", stored as ad1_1.ts, ad1_2.ts and ad1_3.ts can be stored on additional content server 44 without inband data. When metadata manger 56 receives a request for ad1_1.ts from rendering device 24, inband data manager 56 first consults a watch list which can indicate that ad1_1.ts is to have inband data inserted into it and that that data is to be a tag, "ad1_START_x" at the start of the ad1 content, and "ad1_1Q_x" at the seven point five second point in the ad1 content.

In this example, "x" represents the appropriate instance counter, as described above, i.e.—when the first instance of ad1_1.ts in a manifest 36 is delivered to rendering device 24, inband data manager 56 would dynamically insert "ad1_START_0" and "ad1_1Q_0" into ad1_1.ts and when the second instance of ad1_1.ts in a manifest 36 is delivered to rendering device 24, inband data manager 56 would insert "ad1_START_1" and "ad1_1Q_1" into ad1_1.ts, etc.

It is also contemplated that some inband data may be stored in the content and inband data manager 56 may add, as desired, additional metadata. For example, it may be that additional content for all users of system 20 includes timed metadata defining the start and end of playback of that content as events, but for some users of system 20, it is desired to have the first quartile, midpoint, and third quartile events as well. In such a case, the metadata for the start and end events will be included in the stored content, while the timed metadata for the first, mid and third quartile events will be inserted into the delivered content, dynamically, by inband data manager 56 in accordance with appropriate entries in the watch list.

In the present invention, rendering device 24 has an event description list, provided to it with manifest 36, or at any other convenient time, which associates various rendering device 24 actions with timed metadata tags. For example, the event description list can define that rendering device 24 report to system 20 when the content corresponding to any timed metadata tag is rendered on rendering device 24.

Thus, if the requested content for "ad1/0/1.ts" is rendered, timed metadata tag "ad1_START_0" will be reported by rendering device 24 to a location defined in the event description list, or elsewhere, such as to content delivery network 40, program management system 28, inband data manager 56 or to any other suitable location/device, not shown.

Thus, an advertiser, or other entity interested in "ad1", will know that playback of "ad1", after main program content prg3.ts, commenced on rendering device 24. If the user continues to watch "ad1" the advertiser will also know that the second, third and fourth quarters of "ad1" were rendered.

If rendering device 24 renders the content for "ad/1/1.ts", timed metadata tag "ad1_START_1" will be reported by rendering device 24 to the advertiser, or elsewhere, etc. As will be apparent, "ad1_START_1" and "ad1_START_0" are unique events within the streamed media program and within the event description list at rendering device 24 and thus each instance of rendering of content which is repeated within a manifest 36 can be uniquely identified and reported, or can be used to trigger other actions at rendering device 24. For example, upon identifying the "ad1_START_0" event, rendering device 24 can lock its playback controls to prevent the user from scrubbing through advertisement ad1. Similarly, upon identifying the "ad1_END_0" event, rendering device 24 can unlock its controls to re-enable scrubbing.

The content of the event description list at rendering device 24 can be provided at any convenient time. For example, timed metadata tags can also include one or more actions to be performed when the tag is identified by rendering device 24. In some embodiments, rendering device action information can be communicated through out-of-band communications channels such as one formed using HTTP while rendering the content. For example, at least some of the definitions of actions associated with a timed metadata tag can be provided to rendering device 24 once the rendering device 24 identifies that metadata tag during the rendering of the associated content. The rendering device 24 can perform metadata tag identification a predetermined amount of time, such as 30 seconds, prior to actually rendering the corresponding portion of the content to facilitate the provision of the definition of desired corresponding actions to device 24. For example, rendering device 24 can identify the "ad1_START_0" event 30 seconds prior to rendering the start of the of advertisement "ad_1 and 'can report the identified tag to a suitable location in system 20, such as inband data manager 56. After reporting the tag, rendering device 24 can then receive a list of rendering device action definitions from the location (e.g. inband data manager 56) to perform in association with the tag, when the rendering of advertisement "ad_1.ts" starts.

As will be apparent, the event description list at rendering device 24 can define a wide variety of rendering device actions for timed metadata tags, including triggering interactive content, and/or "click through" content and, with the present invention, those timed metadata tags uniquely identify rendering events. For example, additional content such as an overlay can be overlaid on a portion of the content rendered upon identification of the event. Alternatively, companion content can be provided around or in the vicinity of the content being rendered.

In some embodiments, overlaid or companion content can be interactive or "click through" content, accepting input in the form of mouse clicks, touch, keyboard and others, and providing response in terms of updated content, change of focus to other applications or windows, startup of other executable applications on the device or transmission of data to other networked locations. For example, clicking on an overlay may cause a browser window to start displaying content from one or more Internet locations.

In one variation, the use of interactivity can allow overlaid or companion content to include mechanisms for providing input to social networking or similar sites such as forums and review sites. Companion content can include, as an example, an input area for providing text input to social networks, such as status updates and likes and dislikes, as well as pre-formed text supplied as part of the companion content that can be posted as status updates. For example, device 24, upon identifying the "ad1_START_1" event indicating the second instance of an advertisement for ACME, can provide, as companion content, the option to post a status update stating, "Can't get enough of ACME".

In some embodiments, rendering device actions can alter the functionality of the rendering device 24 and related software. For example, as previously discussed, playback controls can be locked to prevent scrubbing through content. In other variations, the displayed size of the content can be locked, preventing the change of content window size, for example. In further variations, content quality can be locked, for example to high definition, preventing changing the resolution at which a stream is requested and/or displayed.

In some embodiments, different actions can be specified for different instances of the additional content. For example, as mentioned above, upon identifying the "ad1_START_0" event, rendering device 24 can lock its playback controls to prevent the user from scrubbing through advertisement ad1. However, upon identifying the "ad1_START_1" event, indicating the second instance of the advertisement ad1, rendering device 24 may not lock its playback controls and instead perform some other action.

In other embodiments, rendering device actions can be based on the number of times an advertisement ad_1 has been viewed, as opposed to the location of the advertisement ad_1 in manifest 36. For example, a user scrubbing through example manifest 36 may cause the "ad1_START_1" event to be triggered prior to the "ad1_START_0" event. Accordingly, rendering device 24 can lock its playback controls to prevent the user from scrubbing through advertisement ad1 upon identifying the "ad1_START_1" event.

Although the examples discussed above relate to the use of timed metadata tags in association with additional content such as advertising, timed metadata tags can also be used as part of the main program. For example, reporting of timed metadata tags associated with the main program can be used to track more precisely the portions of the main program viewed, or to lock the player controls to prevent scrubbing. Other uses of metadata tags with the main program such as identification of an event causing the rendering device 24 to provide a stock ticker, sports scores, headlines and other further content relevant, for example, to the content being viewed at the time of the event will now occur to a person of skill.

The present invention teaches a method and system for uniquely defining and identifying events within a streaming media program. Programs and additional content can be stored with inband data in the stored content and that inband data can be dynamically updated, to include additional information such as global unique identifier, instance counters and time stamps, when the stored content is requested by a rendering device. The additional information is used to uniquely identify the rendering of the program or additional content to allow a rendering device to perform actions based upon those unique identifiers.

The above-described embodiments of the invention are intended to be examples of the present invention and alterations and modifications may be effected thereto, by those of skill in the art, without departing from the scope of the invention which is defined solely by the claims appended hereto.

We claim:

1. A method of identifying events in streaming media programs, comprising:
   receiving, by a rendering device from a streaming media system, a manifest comprising identifiers of a plurality of chunks of a streaming media program and additional content;

receiving, by the rendering device from the streaming media system, an event description list comprising identifiers of events and corresponding actions;

transmitting, by the rendering device to the streaming media system, a request for a chunk of the plurality of chunks of the additional content, the request comprising chunk identification data and instance data;

receiving, by the rendering device from the streaming media system, the chunk of the plurality of chunks, the chunk comprising modified in-band timed metadata encoding a first event identifier in the event description list and instance information based on the instance data appended by the streaming media system to in-band timed metadata;

decoding, by the rendering device, the chunk and reading, during decoding of the chunk, a first event identifier from the modified in-band timed metadata of the chunk;

selecting, by the rendering device responsive to reading the first event identifier, a first action corresponding to the first event identifier in the event description list; and performing, by the rendering device, the first action selected from the event description list.

2. The method of claim 1, comprising transmitting, to the streaming media system, a report containing data indicative of the rendering device performing the first action.

3. The method of claim 1, wherein performing the first action includes changing a display resolution.

4. The method of claim 1, wherein performing the first action includes reporting, by the rendering device to the streaming media system, decoding of the chunk.

5. The method of claim 1, wherein performing the first action includes displaying, by a video player executed by the rendering device, the additional content overlaid over a presentation of the streaming media program.

6. The method of claim 5, wherein performing the first action includes locking the video player while displaying the additional content.

7. The method of claim 1, comprising confirming playback of a specified portion of the streaming media program.

8. A method of identifying events in streaming media programs, comprising:

transmitting, by a streaming media system to a rendering device, a manifest comprising identifiers of a plurality of chunks of a streaming media program and additional content;

transmitting, by the streaming media system to the rendering device, an event description list comprising identifiers of events and corresponding actions;

receiving, by the streaming media system from the rendering device, a request for a chunk of the plurality of chunks, the request comprising chunk identification data and instance data;

retrieving, by the streaming media system, the chunk, the chunk including in-band timed metadata;

appending, by the streaming media system, instance information to the in-band timed metadata based on the instance data to generate modified in-band timed metadata that includes an encoded first event identifier in the event description list;

transmitting, by the streaming media system to the rendering device, the chunk of the plurality of chunks;

receiving, by the streaming media system from the rendering device, a report containing data indicative of the rendering device performing a first action corresponding to the first event identifier in the event description list.

9. The method of claim 8, comprising appending the modified in-band timed metadata to the transmitted chunk of the plurality of chunks.

10. The method of claim 8, wherein performing the first action includes reporting, by the rendering device to the streaming media system, decoding of the chunk.

11. The method of claim 8, wherein performing the first action comprises displaying, by a video player executed by the rendering device, the additional content overlaid over a presentation of the streaming media program.

12. The method of claim 8, comprising receiving confirmation of playback of a specified portion of the streaming media program.

13. A streaming media system, comprising:

a program management system configured to:
 transmit, to a rendering device, a manifest comprising identifiers of a plurality of chunks of a streaming media program and additional content, and
 transmit, to the rendering device, an event description list comprising identifiers of events and corresponding actions;

a content delivery network configured to:
 receive, from the rendering device, a request for a chunk corresponding to one of the identifiers of the manifest, the request comprising chunk identification data and instance data,
 retrieve the chunk, the chunk including in-band timed metadata encoding video data and audio data,
 append instance information to the in-band timed metadata based on the instance data to generate modified in-band timed metadata that includes an encoded first event identifier in the event description list, and
 transmit, to the rendering device using a transport stream media protocol responsive to the request, the chunk; and an in-band data manager configured to:
 receive, from the rendering device, a report containing data indicative of the rendering device performing a first action corresponding to the first event identifier in the event description list.

14. The streaming media system of claim 13, the in-band data manager further configured to append the modified in-band timed metadata to the transmitted chunk.

15. The streaming media system of claim 13, wherein performing the first action includes reporting, by the rendering device to the streaming media system, decoding of the chunk.

16. The streaming media system of claim 13, wherein performing the first action comprises displaying, by a video player executed by the rendering device, additional content overlaid over a presentation of the streaming media program.

17. The streaming media system of claim 13, comprising receiving confirmation of playback of a specified portion of the streaming media program.

18. A non-transitory computer readable medium storing instructions that, when executed by a processor, cause the processor to:

transmit, to a rendering device, a manifest comprising identifiers of a plurality of chunks of a streaming media program and additional content;

transmit, to the rendering device, an event description list comprising identifiers of events and corresponding actions;

receive, from the rendering device, a request for a chunk of the plurality of chunks, the request comprising chunk identification data and instance data;

retrieve the chunk, the chunk including in-band timed metadata;

append instance information to the in-band timed metadata based on the instance data to generate modified in-band timed metadata that includes an encoded first event identifier in the event description list;

transmit, to the rendering device, the chunk of the plurality of chunks; and receive, from the rendering device, a report containing data indicative of the rendering device performing a first action corresponding to the first event identifier in the event description list.

19. The non-transitory computer readable medium of claim 18, the instructions further causing the processor to append the modified in-band timed metadata to the transmitted chunk.

20. The non-transitory computer readable medium of claim 18, the instructions further causing the processor to receive confirmation of playback of a specified portion of the streaming media program.

\* \* \* \* \*